April 9, 1940.   W. KALBSKOPF   2,196,677
CONVERTER
Filed April 26, 1938
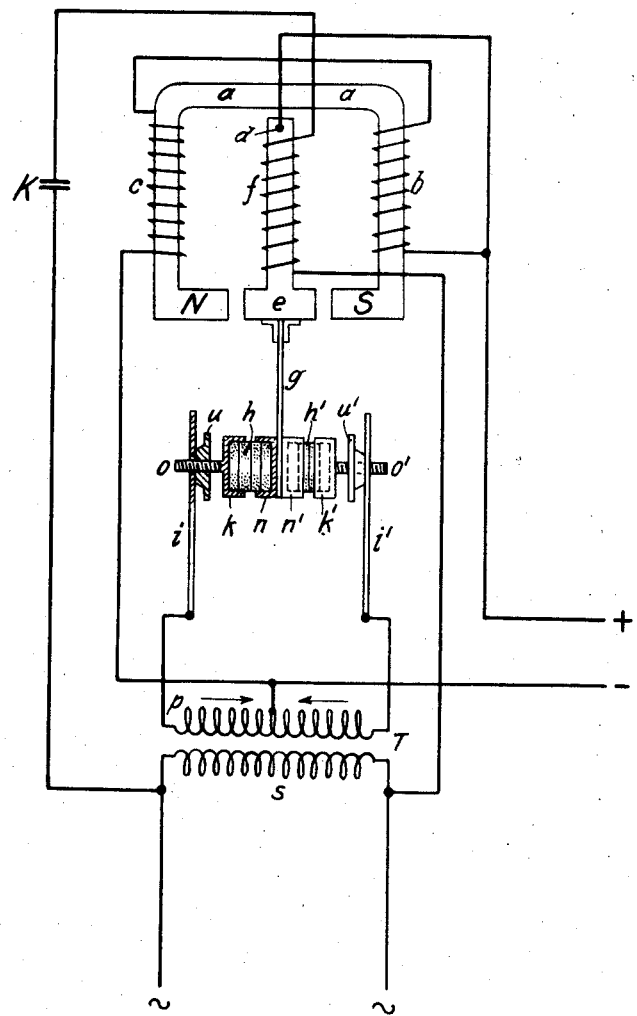
Inventor:
WalterKalbskopf
by E.D.Phinney
Attorney Patented Apr. 9, 1940

2,196,677

UNITED STATES PATENT OFFICE 2,196,677

CONVERTER

Walter Kalbskopf, Nuremberg, Germany, assignor to Süddeutsche Apparatefabrik G. m. b. H., Nuremberg, Germany, a company Application April 26, 1938, Serial No. 204,267
In Germany May 14, 1937

2 Claims. (Cl. 175—365)

The present invention relates to converters, and more particularly to means for converting direct current into alternating current. Such devices have for their object to change an available direct current into any desired form within its capability of voltage transformation, that is to say, to convert a continuously and uniformly flowing current into a rhythmically variable current.

Devices adapted to convert a direct current into an alternating current are, by way of an example, applicable for the purpose of producing the anode voltage for autocar radio receiving apparatus or other non-stationary wireless receiving or transmitting equipments. The operation of the direct current to alternating current converters heretofore adopted for the mentioned purpose is based upon the pendulum converter principle, according to which a pendulum or reed is caused to vibrate either at its natural frequency under the control of an electromagnetic coil in co-operation with a self-interrupter contact, or in rhythm with an alternating current which is impressed upon the system. The vibrating pendulum or reed alternately opens and closes contacts so as to clip the applied direct current which is intermittently conveyed in one and the opposite direction through the primary winding of a transformer, in the secondary winding of which an alternating voltage is induced. This type of device has the disadvantage that the oscillating contacts are frequently impaired on account of inevitable arcings and, moreover, the abrupt and momentary contact make and break cause the wave form of the alternating current thus produced to strongly depart from the sinusoidal shape so that considerable expenditure in smoothening means is required. The heretofore mentioned difficulties present in the known devices of this type are avoided by my novel direct current to alternating current converter.

The conversion of direct current energy in alternating current energy according to the present novel idea is based upon the known resistance change which occurs when a number of small carbon discs or plates facing one another are subjected to a variable compressive stress through the agency of a vibratory armature. The armature adapted to control the electric energy of the system is moved according to the invention by the alternating current of an electrical oscillatory circuit adapted to apply its oscillation energy to the vibratory portion of the direct current to alternating current converter.

The invention will be more readily understood from the following description taken in conjunction with the single figure which diagrammatically illustrates the inventive arrangement.

In this figure, a laminated iron core or yoke $a$ carries two windings $b$ and $c$ which are connected to a direct current source so as to produce a magnetic field between the two pole-pieces N and S. An armature $e$ likewise made of laminated sheet iron is arranged between the two pole-pieces and pivotally mounted at the point $d$. A further winding $f$ connected in series with a condenser K and the secondary winding $s$ of the transformer T is wrapped around the armature $e$. A tongue $g$ is electrically connected to the free end of the armature $e$ remote from the pivot $d$. One set comprising a number of small carbon discs or plates $h$ and $h'$, the principal faces of which are in contacting relation to one another, is arranged to each side of the vibratory tongue $g$. The individual carbon discs of each set are fitted in cup-shaped members $k$, $n$ and $k'$, $n'$, respectively. The free ends of the leaf springs $i$, $i'$ arranged on either side of the carbon disc assemblies are adapted to exert a given pressure upon the disc assemblies toward the tongue $g$ so as to maintain these discs in their relative positions. A flange or nut $u$, $u'$ in co-operation with a bolt $o$, $o'$ on either side serves for adjusting the pressure on the carbon discs between the appertaining leaf spring and the tongue $g$. The fixed ends of the leaf springs $i$, $i'$ are connected to the ends of the primary winding $p$ of the transformer T. The mid-point of the primary winding $p$ and the tongue $g$, the latter over the armature $e$ and the pivot $d$, are connected to the direct current source. It will be understood that the electromagnet of the converting device may be replaced by a permanent magnet of steel.

When the direct current to alternating current converter is connected to the direct current source, the resulting alternate magnetization of the electromagnetic system causes the pivotally mounted armature $e$ to vibrate. The mechanical forces thus developed are alternately received by the leaf springs $i$ and $i'$ so that the entire system forms an oscillatory circuit operating with constant oscillation amplitudes. The condenser K is so dimensioned that the circuit formed by this condenser and the inductive winding $f$ constitutes means capable to oscillate in voltage resonance with the secondary alternating voltage. The alternating current flowing through the winding $f$ is therefore in phase with the secondary voltage of the transformer.

For example, if the armature moves to the right side toward the south pole S under the influence of the alternating magnetization, the carbon discs on the right side are subjected to compression so that the ohmic resistance of the disc assembly gradually decreases. Proportional to the decrease, the current intensity increases in the circuit established from the plus pole of the battery, over pivot d, armature f, tongue g, carbon discs h', leaf spring i', right half of the primary winding p of the transformer T, to the minus pole of the battery. This current reaches its maximum intensity at the moment when the tongue g of the vibrating armature e exerts its maximum compression on the carbon discs. At this moment, however, the induced voltage in the secondary winding becomes zero. Since the circuit in which the condenser K and the winding f are included is in resonance with the secondary voltage, as already stated above, also the current in the winding f presents zero value. The attractive force thus decays so as to allow the armature to restore to normal. The direct current flow through the winding p decreases, while the secondary voltage and the current in the winding f reverse their directions and increase with the result that the armature is attracted toward the opposite side, i. e. by the north pole. As soon as the armature has passed its mid-position, the left carbon discs are compressed. The current in the primary winding p reverses its direction and its intensity gradually increases. The direction of the current flow through the winding f during this cycle is the same as during the cycles heretofore described since the current direction in the primary winding has also been reversed due to the opposite winding sense. The current intensity in the winding f again gradually decreases to zero which value prevails when the armature has reached its utmost left position, whereupon the armature again moves toward the right side so as to start a new cycle of operation. The desired load current will be derived from the secondary winding s of the transformer T and again rectified in any known manner.

Because of the fact that the armature is forced to vibrate only in response to the alternating frequency impressed upon the winding f, the frequency of the tongue g may be changed within certain limits by varying the capacity k.

Before the above described direct current to alternating current converter is taken in use, the armature must be so adjusted that the carbon discs just abut against one another without applying any pressure. This is of great importance for noiseless operation without arcings.

Tests have proven that carbon discs of hard material reliably withstand the stresses set up during the operation of the devices. The number of carbon discs of each set is causative to the voltage applied to the device. Satisfactory results were obtained with carbon discs of 10 mm. diameter at a load of 5 amperes.

An accurate and automatic start of the device may be secured without the aid of additional expedients by a slight unsymmetrical adjustment of the two leaf springs i and i'. The relative spacial position of the direct current to alternating current converter according to the invention is irrelevant for its correct operation. Due to the gradual current increase and decrease in response to the compression and release of the carbon disc assemblies, the alternating current induced in the secondary winding generally follows the sine shape oscillation. Consequently, only relatively simple means are required for the subsequent smoothing of this current in order to obtain the desired smooth direct current.

The apparatus according to the invention practically operates without arcings so that no disturbances will be set up which otherwise may interfere broadcasting performances. The non-fusibility of the carbon prevents sticking at the contact surface of the carbon discs.

What is claimed is:

1. A direct current to alternating current converter comprising, a pole-piece equipped electromagnetic system fed from a direct current source, an armature electrically connected to the direct current source and pivotally mounted at one end, its free end being capable of vibration between the pole-pieces of said electromagnetic system, a winding on said armature, two sets of carbon discs arranged in axial relation to one another on either side of said armature, each set being composed of a number of individual carbon discs having their principal faces contacting each other, means conductively associated with the outer ends of said sets, means capable of transferring the vibrations of said armature to the center between said sets of carbon discs and to establish electric connection between said armature and said sets of carbon discs, a transformer carrying a primary and a secondary winding, said primary winding having its outer ends connected to said first mentioned means and its mid-point connected to the direct current source, a condenser arranged in series with said armature winding and said transformer primary winding, the vibrating armature being adapted to set up current variations in said primary transformer winding by alternately varying the ohmic resistance of said sets of carbon discs by compression and controlled by an alternating current in voltage resonance with the voltage induced from said primary into said secondary transformer winding.

2. A direct current to alternating current converter comprising, a pole-piece equipped electromagnetic system fed from a direct current source, an armature electrically connected to the direct current source and pivotally mounted at one end, its free end being capable of vibration between the pole-pieces of said electromagnetic system, a winding on said armature, a tongue electrically associated with the free end of said armature, a leaf spring arranged on either side of said tongue, two sets of carbon discs each set being composed of a number of individual carbon discs having their principal faces contacting each other, cup-shaped members at each end of said sets and partially encompassing the individual carbon discs, means for adjusting the pressure of said leaf springs toward said sets of carbon discs, a transformer carrying a primary and a secondary winding, said primary winding having its outer ends associated with said leaf springs and its mid-point connected to the direct current source, a condenser arranged in series with said armature winding and said transformer primary winding, said tongue being adapted to set up current variations in said primary transformer winding by alternately varying the ohmic resistance of said sets of carbon discs by compression, the vibrations of said armature being controlled by an alternating current in voltage resonance with the voltage induced from said primary into said secondary winding.

WALTER KALBSKOPF.